350-270 CROSS REFERENCE SEARCH ROOM

Sept. 10, 1968 H. WEINSTEIN 3,400,647

HIGH-SPEED SHUTTER USING A MAGNETOSTRICTIVE TRANSDUCER

Filed Jan. 19, 1966

INVENTOR.
HILLEL WEINSTEIN
BY
Edward J. Norton
Attorney

United States Patent Office 3,400,647
Patented Sept. 10, 1968

3,400,647

HIGH-SPEED SHUTTER USING A MAGNETOSTRICTIVE TRANSDUCER

Hillel Weinstein, Kendall Park, N.J., assignor to Radio Corporation of America, a corporation of Delaware
Filed Jan. 19, 1966, Ser. No. 521,724
5 Claims. (Cl. 95—53)

ABSTRACT OF THE DISCLOSURE

A light control device is constructed by clamping one end of a foil of magnetostrictive material to a transparent substrate leaving one end of the foil free to move in a light beam. Upon application of a magnetic field, the foil changes dimensions and correspondingly causes the free end of the foil to move and control the amount of light that can pass through the substrate.

Figures 1, 2:
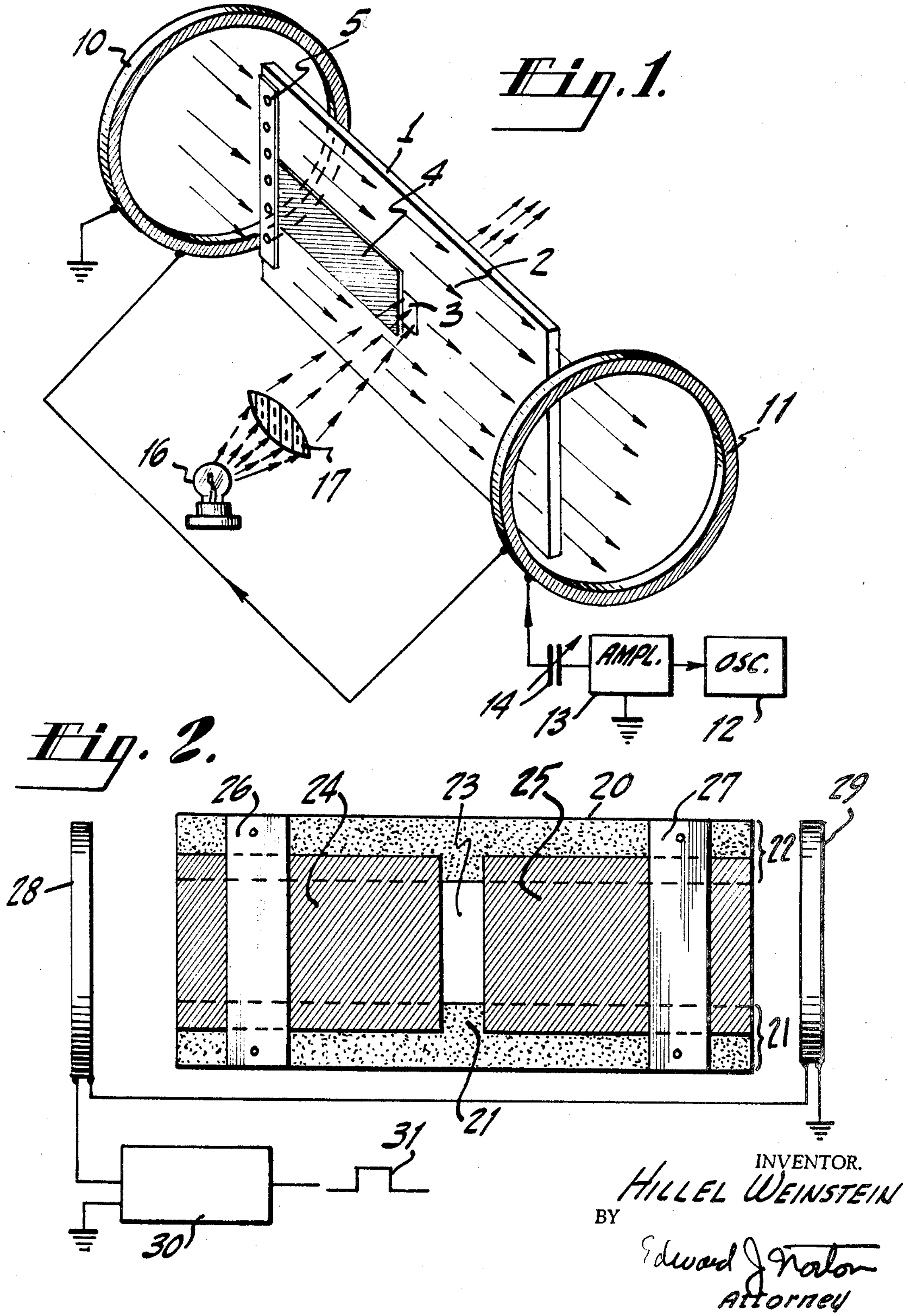

The present invention relates to an apparatus for effecting the control of a light beam and more particularly to a light shutter actuated by a magnetic field applied to magnetostrictive materials.

An object of this invention is to provide shutters which have improved speed and operating characteristics.

Briefly, in accordance with one embodiment of this invention, a foil of opaque magnetostrictive material is clamped to a substrate with one end of the foil free to move. The moveable end of the foil of opaque magnetostrictive material forms a boundary of an aperture in the substrate which will allow light to pass through the substrate, the substrate being coated or otherwise formed so that it is opaque except at the area of the aperture. A magnetic field is applied along the surface of the foil of opaque magnetostrictive material to thereby cause the moveable end of the foil to move the boundary of the aperture and thereby control the amount of light that passes therethrough.

Other objects and many of the advantages of this invention will be readily appreciated by reference to the following detailed description when considered in conjunction with the accompanying drawing wherein:

FIG. 1 is a perspective view of one embodiment of the present invention in the open position, and FIG. 2 is a plan view of another embodiment of the present invention in the open position.

Referring now to FIG. 1, there is shown a perspective view of an embodiment of this invention. One side of a piece of flat transparent substrate 1 is covered with an opaque material 2 so as to leave within the substrate a small aperture or slit 3 that will allow light to pass. The transparent substrate 1 may be made out of a variety of transparent materials such as Lucite, glass, or Plexiglas. The opaque material 2 could be opaque tape, paint or any such nontransparent material. The width of the aperture or slit 3 can be, for example, 2 mils. A foil of magnetostrictive material 4 which can be, for example, about 2 mils thick and 1 by 3.1 cm. is mounted to the substrate using clamp 5. Clamp 5 holds one end of foil 4 to the substrate and allows the free end to bound one end of slit 3. The foil of magnetostrictive material 4 is likewise opaque and is made of positive magnetostrictive coefficient 50:50 permalloy (50% nickel and 50% iron), for example. A magnetic field drive is obtained by generating a sinusoidal waveform from oscillator 12 at a desired frequency such as 2.8 kc., amplifying this waveform with an amplifier 13, and applying this output current to drive a Helmholtz coil system 10 and 11 or other suitable magnetic field applying device by means of a series capacitor 14.

In a test set-up, the coils 10 and 11 were 16 inches in diameter and had a sensitivity of 5.3 oersted/ampere.

The series capacitor 14 was variable between 0–100 $\mu$f. This arrangement provided an applied magnetic field of varying frequency at a constant peak amplitude of 11 oersteds. A high intensity light source 16 was focused through a lens 17 to collimate a light beam about ¼ inch in diameter toward the slit 3. The magnetic field H of 11 oersteds was applied across the opaque magnetostrictive foil 4 which had positive material coefficient causing elongation-attraction action. As the length of the foil 4 varied, the width of the slit 3 varied. The width of the slit 3 should change at twice the frequency of the applied magnetic field since the magnetostrictive material 4 changes dimensions every time the magnetic field is applied across the material 4 irrespective of the fact that it may be applied in an opposite direction. With the frequency of 2.8 kc. given by way of example, the width of the slit 3 will change at 5.6 kc. In this manner an extremely high speed shutter can be effected which opens and closes a fixed slit at a speed dictated by an electrical signal.

FIG. 2 shows a plan view of another embodiment of the present invention. Opaque tape is placed over areas 21 and 22 of a transparent substrate 20 leaving an aperture or slit 23 whereby focused light can pass therethrough. Two foils of magnetostrictive material 24 and 25 are clamped over the slit 23 using clamps 26 and 27 located at one end of the respective foils 24 and 25. The foils of magnetostrictive material 24 and 25 are clamped at one end and are of a length to cause the foils 24, 25 to overlap at their opposite free ends. The foils are free to move at their free ends where the two foils overlap. The foils of magnetostrictive material 24, 25 used in the embodiment of FIG. 2 are assumed to have negative magnetostrictive coefficients. That is, upon the application of a magnetic field across the foils 24 and 25, the foil material shortens rather than elongates. Coils 28 and 29 which are provided near the clamped ends respectively of foils 24 and 25 apply a magnetic field along the two foils. The magnetic field is controlled from a current source 30 which can be controlled in turn by an accurately controlled electrical pulse 31. Upon the application of an electrical pulse, a magnetic field is supplied for the duration of the pulse across the foils 24 and 25 causing them to shorten and allow the passage of light through slit 23 between the ends of foils 24 and 25, as shown in FIG. 2. In this manner an accurately controlled high-speed shutter can be provided with a variable shutter speed that is controlled by the length of an electrical pulse.

Many modifications and variations of the present invention are possible in light of the above teachings. It is therefore to be understood that within the scope of the appended claims the invention may be practiced otherwise than as specifically described.

What is claimed is:

1. A light control device comprising:
   a member having a transparent portion through which light can pass,
   a foil of opaque magnetostrictive material having a characteristic whereby upon the application of a magnetic field to said material said material undergoes a marked change in the dimensions of said foil, said magnetostrictive material being mounted to said member with one edge of said foil fixed and another edge of said foil free to move relative to said transparent portion of said member, and
   means for applying a magnetic field to said foil to cause said marked change in the dimensions of said magnetostrictive material and to correspondingly cause said free edge of said foil to move and control the amount of said light that can pass through said transparent portion of said member.

2. A light shutter comprising:
a flat member having a transparent portion through which light can pass,
a foil of opaque magnetostrictive material having a positive magnetostrictive coefficient mounted to said member with one end of said foil fixed and another end of said foil moveable to form a variable boundary of said transparent portion of said member, and
an inductive member mounted relative to said foil to provide a magnetic field across said foil upon the application of signal current through said inductive member to cause an elongation of said foil in the presence of said signal current and a corresponding control of said light passing through said transparent portion.

3. A light shutter comprising:
a flat member having a transparent portion through which light can pass,
two foils of opaque magnetostrictive material having negative magnetostrictive coefficient mounted to said member over said transparent portion with one end of each of said foils fixed and the opposite free ends of said foils overlapping one another, and
an inductive member mounted relative to said magnetostrictive material to provide a magnetic field across said foils upon the application of signal current through said inductive member to cause contraction of said foils in the presence of said signal current and a corresponding control of said light passing through said transparent portion.

4. A light shutter comprising:
a flat member having a transparent portion through which light can pass,
two foils of opaque magnetostrictive material having negative magnetostrictive coefficient mounted to said member over said transparent portion with one end of each of said foils fixed and the opposite free ends of said foils overlapping one another to obscure said transparent portion,
an inductive member mounted relative to said magnetostrictive material to provide a magnetic field across said foils upon the application of signal current through said inductive member to cause contraction of said foils in the presence of said signal current and a corresponding control of light passing through said transparent portion, and
means including a signal generator for providing a signal current to said inductive member at determined time durations to provide a controlled shutter speed.

5. A light shutter comprising:
a flat member having a transparent portion through which light can pass,
a foil of opaque magnetostrictive material having a positive magnetostrictive coefficient mounted to said member with one end of said foil fixed and another end of said foil moveable to form a variable boundary of said transparent portion of said member,
an inductive member mounted relative to said foil to provide a magnetic field across said foil upon the application of signal current through said inductive member to cause an elongation of said foil in the presence of said signal current and a corresponding control of said light passing through said transparent portion, and
means including an oscillator, amplifier and capacitor in series with said inductive member to provide said signal current to said inductive member and a corresponding shutter action at a predetermined repetitive rate.

References Cited

UNITED STATES PATENTS 3,282,187 11/1966 Cassidy ---------------- 95—53

JOHN M. HORAN, *Primary Examiner.*